United States Patent Office 3,497,372
Patented Feb. 24, 1970

3,497,372
COMPOSITIONS AND ARTICLES CONTAINING CROSS-LINKED ASPHALTENE
Seymour W. Ferris, deceased, late of Mount Holly, N.J., by Lucretia G. Ferris, sole executrix, Vincentown, N.J., and James B. Clelland, Newtown Square, and Ernest P. Black, West Chester, Pa., assignors to Sun Oil Company, Philadelphia, Pa., a corporation of New Jersey
No Drawing. Continuation-in-part of application Ser. No. 468,642, June 30, 1965. This application Sept. 22, 1966, Ser. No. 582,199
Int. Cl. C08h *13/00, 13/02*
U.S. Cl. 106—281    10 Claims

ABSTRACT OF THE DISCLOSURE

New compositions comprising cross-linked asphaltenes and fillers and shaped articles prepared therefrom, said asphaltenes characterized as having a melting point of at least 600° F. and a solubility in carbon disulfide of not more than 50 weight percent.

CROSS REFERENCES TO RELATED APPLICATIONS

This application is a continuation-in-part of our application Ser. No. 468,642, filed June 30, 1965, now abandoned, which is a division of our application Ser. No. 161,375, filed Dec. 22, 1961, now U.S. Patent No. 3,264,206.

BACKGROUND OF THE INVENTION

Asphaltenes are organic materials derived from asphalt and are defined by their solubility characteristics in certain arbitrarily selected solvents. The asphaltenes are insoluble in low-boiling saturated hydrocarbons such as petroleum naphtha, pentane, and hexane, but are soluble in carbon tetrachloride and carbon disulfide. These solubility characteristics are the basis of the separation of asphaltenes as a distinct phase from asphalts from which they are normally recovered. They are usually separated from the solvent in the form of a coarse brown-black powder having essentially no cohesiveness. The yield and properties of the asphaltenes depend upon the asphalt source, the kind and amount of solvent used for separation, and the separation conditions. Asphaltenes have a high carbon-to-hydrogen atomic ratio and contain varying amounts of oxygen, sulfur, and nitrogen. A high carbon-to-hydrogen ratio indicates a strongly aromatic nature. For example, the value for saturated hydrocarbons is about 0.5; for benzene, about 1.0; and for naphthalene, about 1.25. The C:H ratio of asphaltenes derived from some typical sources is as follows:

| Origin: | C:H ratio of asphaltenes, naphtha precipitation |
|---|---|
| Residual bitumens | .85–.91 |
| Blown bitumens | .82–.88 |
| Highly cracked material | 1.25 |
| Trinidad asphalt | .79 |
| Gilsonite | .71 |

Asphaltenes are believed to have a molecular weight of from about 2000 to about 10,000. The actual molecular configuration of asphaltenes is not known. Some observers suggest a fused ring configuration, and others suggest rings joined by chains (The Properties of Asphaltic Bitumen, Pfeiffer).

Asphalts flow under very small stresses and thus have no application in fields of use which require rigidity under stress and temperature fluctuation. For example, in road building the asphalt merely holds the aggregate together; the aggregate supplies the rigidity. The surface asphalt softens markedly in warm weather. Asphaltenes are a powder and may be pressed or molded into various shapes, but the shapes are very brittle and break apart rapidly under pressure.

An object of this invention is to provide new and useful compositions comprising cross-linked asphaltene molecules and fillers which compositions are particularly suited for making shaped articles. A further object of this invention is to provide compositions comprising cross-linked asphaltene molecules and fillers which compositions are particularly suitable for molding or pressing to make shaped articles.

DESCRIPTION

As disclosed in the above-noted U.S. patent, of which the present application is a division, we have found that asphaltenes are very reactive with chlorine and that when part of the chlorine is removed, the product exhibits properties indicating that the asphaltene molecules have been joined in a carbon-to-carbon coupled asphaltene-to-asphaltene linkage. The melting point of the treated asphaltenes is raised 300° F., and the solubility in $CCl_4$ and $CS_2$ is greatly lowered. Additionally, we have found that asphaltenes will take up from 10–30% by weight chlorine at ambient temperature without using a solvent.

We have now discovered that compositions suitable for forming shaped articles by methods such as pressing or molding can be provided by blending cross-linked asphaltene molecules having carbon-to-carbon coupled asphaltene-to-asphaltene linkage with a filler. The ratio of filler to cross-linked asphaltene molecules can be in the range of 2 to 900 parts of filler per 100 parts of cross-linked asphaltenes. The preferred range is 10 to 750 parts of filler per 100 parts of cross-linked asphaltenes and a particularly suitable range is 50 to 90 parts filler per 10 to 50 parts cross-linked asphaltenes.

Fillers suitable for mixing or blending with cross-linked asphaltene molecules to form the compositions of the present invention include asbestos, sand, clays, paper, wood, flour, sawdust, glass fibers, asphalts, calcium carbonate, inorganic oxides, inorganic silicates, metallic fibers, metallic powders, thermoplastic resins such as polyethylene, polypropylene, polyvinyl chloride, polypentenes and thermo-setting resins such as phenol formaldehyde polymers.

These compositions can be used to form shaped articles such as hard board, insulating board and wallboard. The compositions of the present invention can also be molded into suitable shapes for use as construction materials, roofing materials, paving and membrane lining materials, pipe fabrication materials, pipe coating materials and potting compounds.

The source of the asphaltenes which are treated to provide the cross-linked asphaltene molecules for the compositions of the present invention is not critical. Any bitumen or asphalt containing asphaltenes is suitable. The two principal sources are native asphalts and asphalts resulting from petroleum refining operations. Asphalts from petroleum refining operations such as deasphalting of crude oils will usually require further solvent treatment to separate or further concentrate the asphaltenes. Air-blown and other chemically-treated asphalts can be used. It is not necessary that the asphaltene concentration of the starting material be 100 percent. However, a concentration of at least 50 wt. percent asphaltenes is required to obtain products with the desired properties. The preferred concentration of asphaltenes is 75 to 100 percent by weight. Solvents such as petroleum naphtha, pentane, hexane, cyclohexane, and diethyl ether can be used to concentrate the asphaltenes. The asphaltene starting material will have a carbon-to-hydrogen atomic ratio of from about 0.70 to about 1.00 and will contain 0–5 wt. percent each of sulfur, nitrogen, and oxygen. Metals such as vanadium, nickel and iron may be present in small amounts usually 1 to 2000 parts per million. For treatment the asphaltenes can be ground to a fine powder and contacted in the dry state, or they may be dispersed in a solvent such as $CCl_4$.

The softening point of the original asphaltene material can be about 300°–400° F., and it is 95–99 percent soluble in $CS_2$. These properties depend on the conditions of the method of concentration.

In carrying out the asphaltene cross-linking process the chlorination and dechlorination steps of the process may be accomplished using conventional equipment. The asphaltene starting material may be obtained by means known in the art, usually multistep solvent precipitation. The asphaltene is placed in any suitable closed reactor and contacted with a chlorinating agent such as chlorine gas. Dechlorination can be accomplished by heating, preferably in an inert atmosphere, or by chemical means.

The chlorination is conducted at temperatures ranging from 10 to 150° F. Pressures ranging from subatmospheric to 100 p.s.i. or more can be used. The time of treatment is on the order of between 5 minutes to 48 hours. Ordinarily, times of 15 to 90 minutes at treating temperatures ranging from 50 to 100° F. are preferred. The asphaltenes may be agitated during chlorination by feeding the chlorine through a sparger, rotating the reactor, motor-driven stirrer, or by other applicable means. The chlorine is usually supplied as chlorine gas although chlorine in other forms can be used. From 5 to 40 weight percent chlorine can be added based on the asphaltene starting material.

The dechlorination step may be carried out immediately following the chlorination step. It can be accomplished by heating in an inert atmosphere such as nitrogen or in air. When the chlorination has been accomplished in the presence of a solvent, dechlorination can be carried out with sodium or potassium. When dechlorination is accomplished by heating, temperatures higher than the chlorination temperature, preferably ranging from 250 to 700° F., are suitable. The chlorine content of the final product is preferably from 5 to 15 weight percent, but higher or lower chlorine contents can be used.

The properties of the cross-linked asphaltenes of the compositions of this invention can be varied by varying the feed and the treating conditions as follows:

|  | Suitable | Preferred |
|---|---|---|
| Feed and Conditions: | | |
| 1. Asphaltene content of feed. | 50–100 wt. percent | 75–100 wt. percent. |
| 2. Chlorination | Any suitable temperature | 50–150° F. |
|  | Any suitable pressure | 5–100 p.s.i.a. |
| 3. Dechlorination | Any suitable temperature higher than the chlorination temperature, i.e., 100–900° F. | 250–700° F. |
|  | Any suitable pressure, i.e., 5–100 p.s.i.a. | 15–17 p.s.i.a. |
| Products: | | |
| 4. Melting point | 600–1,500° F | 750–1200° F. |
| 5. Solubility in $CS_2$ | 0–70 wt. percent | 0–50 wt. percent. |
| 6. Solubility in $CCl_4$ | do | Do. |
| 7. Solubility in naphtha. | 0–25 wt. percent | 0–15 wt. percent. |

Cross-linked asphaltene products having a $CS_2$ solubility of 0–50 wt. percent together with a naphtha solubility of 0–15 wt. percent and a melting point of 750–1200° F. give excellent strength and high temperature properties to coating compositions and molded articles in which they are employed in major or minor amounts.

The following examples show various procedures for providing cross-linked asphaltene molecules:

EXAMPLE 1

Asphaltenes were prepared from a vacuum reduced petroleum residuum asphalt having the following properties:

| | |
|---|---:|
| Viscosity—Saybolt furol @ 210° F. | 1191 |
| Specific gravity @ 77° F. | 1.019 |
| Softening point, ° F. | 111 |
| Penetration @ 32° F. (ASTM D–5–25) | 25 |
| Penetration @ 39.2° F. | 33 |
| Penetration @ 77° F. | 103 |
| Flash (open cup), ° F. | 655 |
| [1] Solubility in 86° naphtha (AASHO T–4635) | 78.3 |
| Naphtha asphaltenes, percent | 21.7 |

[1] For the purpose of these examples, solubility in naphtha will be considered the measure of asphaltenes, i.e., the portion which is insoluble in the solvent is asphaltenes.

6.85 gal. (35 lb.) of the above asphalt was heated to about 180° F. and extracted with 30.3 gal. of 86° naphtha. The solution was allowed to settle, and the solvent layer was drawn off. The raffinate was extracted again with 34.3 gal. of solvent. After settling, the solvent layer was drawn off. The wet product was air dried, then heated in a steam bath, and dried. The dry asphaltene yield was 6066 grams.

Two additional portions of the above asphalt were extracted in the same manner. The total dry asphaltenes amounting to 15,189 grams were ground and sieved to a fine powder. Ninety-six percent of the powder passed through an 8-mesh sieve. The asphaltenes were 13.1 percent soluble in naphtha, 99.8 percent soluble in carbon disulfide, and 98.7 percent soluble in carbon tetrachloride. Thus the naphtha asphaltenes were 86.9%. This material was used for the examples which follow.

EXAMPLE 2

504 grams of the asphaltenes of Example 1 were placed in an 11-inch-diameter glass dish having a glass cover. The cover had openings for circulating chlorine. Chlorine was passed from a cylinder through tubing and the dish at a rate of 250–600 cc./min. for 20.5 hours at 80° F. Nitrogen was then passed through the dish to remove unreacted chlorine. The net weight gain of the chlorinated asphaltenes was 178 grams.

Runs 1–7 of Table A show the effect of time on the quantity of chlorine reacted. Runs 8 and 9 shows the effect of dissolving the asphaltenes in carbon tetrachloride and bubbling chlorine through the solution.

Chlorination has no appreciable effect on the melting point and naphtha solubility of asphalts or of asphaltenes. Dechlorination, however, results in dramatic changes in the properties and molecular configuration of the asphaltenes.

TABLE A.—CHLORINATED ASPHALTENES

| Run No. | Asphaltenes, gms. | $CCl_4$ (cc.) | Treating Conditions Temp., ° F. | Time, hrs. | Cl, wt. percent | C/H | $CS_2$,[a] sol. percent | $CCl_4$,[b] sol. percent | Naphtha,[c] sol. percent |
|---|---|---|---|---|---|---|---|---|---|
| | Untreated Asphaltenes | | | | | 0.85 | 99.8 | 98.7 | 13.1 |
| 1 | 504 | | 80 | 20.5 | 27.1 | 0.91 | 99.7 | 99.0 | 19.0 |
| 2 | 500 | | 80 | 5.5 | 16.1 | 0.90 | | | |
| 3 | 500 | | 80 | 4.17 | 17.75 | 0.94 | 99.3 | 98.7 | 21.9 |
| 4 | 500 | | 80 | 0.38 | 4.72 | 0.84 | | | |
| 5 | 500 | | 80 | 41.0 | 30.0 | | | | |
| 6 | 1,000 | | 80 | 1.0 | 2.96 | | | | |
| 7 | 60 | 350 | 80–115 | 2.0 | 34.1 | 1.08 | | | |
| 8 | 100 | 600 | 80–130 | 0.22 | 12.9 | 0.96 | | | |
| 9 | 50 | 320 | 80 | 2.0 | 41.0 | 1.07 | | | |

[a] Solubility obtained following ASTM D4–52.
[b] Solubility obtained following ASTM D165–42.
[c] Solubility obtained following AASHO T–4635.

EXAMPLE 3

500 grams of the chlorinated asphaltenes of Example 2, containing 27.1 weight percent chlorine, was placed in an 11-inch-diameter covered glass dish. The dish was placed in a constant-temperature oven, and nitrogen was passed through the dish. The oven was maintained at 400° F. for 3½ hours. At the end of this time the weight loss was 71 grams, and the chlorine content was 13.25 percent. The properties of this product are shown in Run 1 of Table B.

200 grams of the above product were further dechlorinated in the same dish and oven at 500° F. for a further period of 3½ hours. The properties of this product are shown in Run 2 of Table B.

Runs 3–5 show the results of dechlorination on asphaltenes chlorinated to 16.1, 4.72, and 2.96 weight percent.

Runs 6–8 show the results of dechlorination in the presence of air and oxygen.

Runs 9 and 10 show the results of dechlorination in the presence of a sodium dispersion.

Run 1 shows the results of treating asphaltenes derived from Gilsonite—a native bitumen. 50 grams of Gilsonite asphaltenes were chlorinated at 80° F. in powder form for 30 minutes to a chlorine content of 21.8%. The intermediate product was dechlorinated at an oven temperature of 550° F. for 1.0 hour to a chlorine content of 4.37%.

tained from Run No. 5 disclosed above in Table B. All components in the mixtures in the following examples are given as parts by weight. Test evaluations of all of the compositions in the following examples appear in Table C.

EXAMPLE 4

A composition was prepared by mixing 25 parts of the cross-linked asphaltenes by means of a mortar and pestle and 75 parts of bar sand. A portion of the mixture was formed into a 1 x 4 x ⅛ inch test blank by heating at a temperature of about 275° F. in a Carver press at a pressure of about 5000 p.s.i.g. The molded test blank was evaluated for appearance and tested to determine its modulus of rupture.

EXAMPLE 5

A composition was prepared and tested in the same manner as Example 4 with the exception that the mixture contained 98 parts of cross-linked asphaltenes and 2 parts of bar sand.

EXAMPLE 6

A composition was prepared and tested as in Example 5 with the exception that the mixture contained 2 parts of glass wool instead of bar sand.

EXAMPLE 7

25 parts of asbestos were mixed with 75 parts of cross-linked asphaltenes by means of a Waring Blendor. A

TABLE B.—DECHLORINATED ASPHALTENES

| Run No. | Dechlorination Temp., °F. | Time, hrs. | Chlorine, wt. percent Before | Chlorine, wt. percent After | C/H Ratio | CS₂, sol. percent | CCl₄, sol. percent | Naphtha, sol. percent | M.P., °F.[a] | M.R.[b] | °F. Pen. 5 [c] | Mold Rating [d] |
|---|---|---|---|---|---|---|---|---|---|---|---|---|
|  | Untreated Asphaltenes |  |  |  | 0.85 | 99.8 | 98.7 | 13.1 | 333 | 186 | 170 | 8 |
| 1 | 400 | 3.5 | 27.1 | 13.25 | 0.97 | 24.1 | 13.9 | 4.0 | 900 |  |  | 5 |
| 2 | 400/500 | 3.5/3.5 | 27.1 | 9.52 | 1.01 | 29.2 | 17.8 | 0.7 | 900 | 305 | 495 | 4 |
| 3 | 550 | 1.0 | 16.1 | 1.95 | 1.07 | 49.5 | 60.0 | 6.1 | 1,000 | 192 | 440 | 6 |
| 4 | 550 | 1.0 | 4.72 | 1.36 | 0.90 | 74.3 | 59.1 | 15.5 | 750 | 224 |  | 8 |
| 5 | 550 | 1.0 | 2.96 | 1.32 |  | 84.0 | 75.0 | 23.7 | 600 | 357 |  | 8 |
| 6 [e] | 300 | 4.0 | 34.1 | 25.90 | 1.10 |  |  |  |  |  |  |  |
| 7 [e] | 400 | 2.0 | 34.1 | 5.90 | 2.21 |  |  |  |  |  |  |  |
| 8 [f] | 400 | 5.5 | 12.9 | 1.22 | 1.94 |  |  |  | 800 |  |  |  |
| 9 [g] | Sodium |  | 12.9 | 0.30 | 0.93 |  |  |  |  |  |  |  |
| 10 [g] | Sodium |  | 16.2 | 9.70 | 0.98 |  |  |  |  |  |  |  |
| 11 | 550 | 1.0 | 21.8 | 4.37 |  | 8.42 |  | 4.11 | 900 |  |  |  |

[a] Melting points over 300° F. were obtained by hot plate using "Tempilstiks" (Tempil Corp., 132 W. 22nd St., N.Y.C.) in an atmosphere of nitrogen.
[b] Modulus of rupture, p.s.i.g. at 75° F.
[c] Temp. in degrees Fahrenheit to which sample must be heated to obtain a penetration of 5.
[d] An arbitrary measurement in which 10 represents excellent compaction and 0 represents essentially no compaction.
[e] Dechlorinated in the presence of air.
[f] Dechlorinated in the presence of air and oxygen.
[g] Dechlorinated with sodium in xylene at 180°–200° F. for 1 hour.

Table B shows that dechlorination results in a dramatic reduction in the solubility of asphaltenes in carbon disulfide, i.e., from 99.8 to values in the range of from 24.1 to 49.5. Since asphaltenes and chlorinated asphaltenes are almost completely soluble in the solvent, it is apparent that the molecular configuration of the asphaltenes has been radically altered by the dechlorination treatment. The same effect is observed when solubility is tested with carbon tetrachloride. These results indicate that the asphaltenes are cross-linked in the form of carbon-to-carbon linkage of asphaltene-to-asphaltene by the chlorination-dechlorination process described above. Additional evidence of higher molecular weight is found by noting the increase in melting point, e.g., from 333° F to 600° to over 1000° F. and by noting the increase in modulus of rupture and the temperature required to obtain a penetration of 5. These properties clearly differ from the properties of air-blown (oxidized) asphalt which has a naphtha solubility of from 50–90% and a solubility in carbon disulfide of 95–100 (see Abraham, Asphalts and Allied Substances, vol. 2, 1961, page 175).

The following examples are given to illustrate several embodiments of the compositions of the present invention. The cross-linked asphaltene molecules used in each of the compositions in the following examples were obportion of the mixture was molded and evaluated in the manner disclosed in Example 4.

EXAMPLE 8

5 parts of ground paper were mixed with 100 parts of the cross-linked asphaltenes by means of a mortar and pestle. A portion of the mixture was molded and evaluated in the manner disclosed in Example 4.

EXAMPLE 9

25 parts of ground paper were mixed with 75 parts of cross-linked asphaltenes by means of a food chopper. A portion of the mixture was molded and evaluated in the manner disclosed in Example 4.

EXAMPLE 10

50 parts of ground paper were mixed with 50 parts of cross-linked asphaltenes by means of a Waring Blendor. A portion of the mixture was molded and evaluated in the manner disclosed in Example 4.

EXAMPLE 11

75 parts of ground paper were mixed with 25 parts of cross-linked asphaltenes by means of a Waring Blendor. A portion of the mixture was molded and evaluated in the manner disclosed in Example 4.

TABLE C.—TREATED ASPHALTENES AND FILLERS

| Example | Filler | Ratio of Filler to Asphaltenes | Molded Article Appearance Rating | Molded Article Modulus of Rupture |
|---|---|---|---|---|
| Blank | | | 7 | 357 |
| 4 | Sand | 75/25 | 7 | 200 |
| 5 | do | 2/98 | 7 | 280 |
| 6 | Glass | 2/98 | 8 | 304 |
| 7 | Asbestos | 25/75 | 8 | 500 |
| 8 | Paper | 5/100 | 8 | 370 |
| 9 | do | 25/75 | | 960 |
| 10 | do | 50/50 | 6 | 2,100 |
| 11 | do | 75/25 | 7 | 2,420 |

The modulus of rupture as disclosed in Table C was obtained by placing the testing blank over two bars spaced two inches apart and exerting pressure on the middle cross section until the blank broke. The formula $$MR = \frac{3PL}{2BT^2}$$

in which:

P=Load in pounds
L=Blank length—inches
B=Blank breadth—inches
T=blank thickness—inches was used to obtain the numerical value for modulus of rupture. Runs were made at room temperature.

Example 4 through 11 disclosed above demonstrate the fact that suitable compositions for making shaped articles can be obtained by blending any one of a large variety of fillers, in a broad range of concentrations with cross-linked asphaltene molecules.

It is to be understood that the foregoing detailed description is given merely by way of illustration and any alteration can be made therein without departing from the spirit and scope of the invention.

We claim:

1. A composition consisting essentially of a mixture of cross-linked asphaltene molecules having carbon-to-carbon coupled asphaltene-to-asphaltene linkage, prepared by chlorinating a bituminous feed material containing 50–100 percent asphaltenes at a temperature in the range of 50–100° F. until the asphaltenes contain 5–30 weight percent chlorine and dechlorinating the intermediate product in an inert atmosphere at a temperature in the range of 200–700° F. until the product contains from 1–10 weight percent chlorine, said cross-linked asphaltene molecules being characterized by a melting point of at least 600° F. and a solubility in carbon disulfide of not more than 50 weight percent, and a filler, the ratio of filler to cross linked asphaltene molecules being in the range of 2 to 900 parts filler per 100 parts cross-linked asphaltene molecules.

2. A composition according to claim 1 wherein the filler is selected from the group consisting of asbestos, sand, clay, paper, wood, flour, glass fiber, asphalt, and calcium carbonate.

3. A shaped article formed of the composition of claim 1.

4. A shaped article according to claim 3 wherein the filler is selected from the group consisting of asbestos, sand, clay, paper, wood, flour, glass fiber, asphalt, and calcium carbonate.

5. A shaped article according to claim 3 consisting essentially of a mixture of from 10–50 weight percent cross-linked asphaltene molecules having carbon-to-carbon coupled asphaltene-to-asphaltene linkage and from 50–90 weight percent of a filler.

6. An article according to claim 5 wherein said filler is sand.

7. An article according to claim 5 wherein said filler is asbestos.

8. An article according to claim 5 wherein said filler is paper.

9. An article according to claim 5, wherein said filler is glass fiber.

10. An article according to claim 5 wherein the wood filler is sawdust.

References Cited

UNITED STATES PATENTS

| | | | |
|---|---|---|---|
| 2,909,441 | 10/1959 | Pickell | 106—278 XR |
| 3,243,311 | 3/1966 | Rogers et al. | 106—280 |
| 3,245,815 | 4/1966 | Hedge | 106—282 XR |
| 3,264,206 | 8/1966 | Ferris et al. | 106—273 XR |
| 3,265,517 | 8/1966 | Clelland et al. | 106—279 XR |
| 3,281,256 | 10/1966 | Rogers et al. | 106—281 |
| 3,287,146 | 11/1966 | Rogers et al. | 106—281 |
| 3,303,151 | 2/1967 | Peters et al. | 106—279 |

JULIUS FROME, Primary Examiner

J. B. EVANS, Assistant Examiner